US007825617B2

(12) United States Patent
Huber

(10) Patent No.: US 7,825,617 B2
(45) Date of Patent: Nov. 2, 2010

(54) DRIVE FOR A MOVABLE FURNITURE PART

(75) Inventor: Edgar Huber, Hard (AT)

(73) Assignee: Julius Blum GmbH, Hochst (AT)

(*) Notice: Subject to any disclaimer, the term of this patent is extended or adjusted under 35 U.S.C. 154(b) by 228 days.

(21) Appl. No.: 12/010,054

(22) Filed: Jan. 18, 2008

(65) Prior Publication Data

US 2008/0116775 A1 May 22, 2008

Related U.S. Application Data

(63) Continuation of application No. PCT/AT2006/000256, filed on Jun. 23, 2006.

(30) Foreign Application Priority Data

Jul. 20, 2005 (AT) ............................ A 1221/2005

(51) Int. Cl.
*G05D 3/00* (2006.01)

(52) U.S. Cl. ........................ 318/466; 318/445; 318/432

(58) Field of Classification Search ................. 318/445, 318/466, 468, 432, 434, 283, 443
See application file for complete search history.

(56) References Cited

U.S. PATENT DOCUMENTS 4,184,724 A * 1/1980 Katz et al. .................. 312/209
4,948,208 A * 8/1990 Schubert ................ 312/334.16
5,030,901 A * 7/1991 Futami ....................... 318/610
5,635,808 A * 6/1997 Roseliep ..................... 318/638
2003/0122519 A1* 7/2003 Huber et al. ................ 318/646
2004/0100169 A1 5/2004 Huber et al.
2006/0061245 A1 3/2006 Huber et al.

FOREIGN PATENT DOCUMENTS

| | | |
|---|---|---|
| DE | 101 08 628 | 8/2001 |
| DE | 20 2004 007 158 | 7/2005 |
| EP | 1 323 363 | 7/2003 |
| EP | 1 374 732 | 1/2004 |
| WO | 2004/100718 | 11/2004 |

OTHER PUBLICATIONS

International Search Report issued Sep. 12, 2006 in the International (PCT) Application of which the present application is the U.S. National Stage.
Austrian Search Report issued Oct. 11, 2005 in the corresponding Austrian patent application.

* cited by examiner

*Primary Examiner*—Rina I Duda
(74) *Attorney, Agent, or Firm*—Wenderoth, Lind & Ponack, L.L.P.

(57) ABSTRACT

A drive for a movable furniture part includes a motor to power the movable furniture part and a control or regulation unit to control or regulate the motor. The control or regulation unit is designed such that it has a threshold value which, if surpassed, causes the actuation of the movable furniture part by the motor. A measurement device is provided to capture the position of the movable furniture part, and the control or regulation unit is designed in such a way that the threshold value varies for at least two different positions of the movable furniture part.

20 Claims, 5 Drawing Sheets

DRIVE FOR A MOVABLE FURNITURE PART

This application is a continuation of International Application No. PCT/AT2006/000256, filed Jun. 23, 2006.

BACKGROUND OF THE INVENTION

The present invention relates to a drive for a movable furniture part, comprising a motor to drive the movable furniture part and a control or regulation unit to control or regulate the motor. The control or regulation unit is designed in such a way that it has a threshold value of a measured unit and if this value is exceeded, this actuates the driving of the movable furniture part by the motor.

A drive of this type is disclosed, for example, in EP 1 374 732 A1. Obviously, every control or regulation unit has a certain threshold value which must be exceeded so that the control or regulation unit becomes active. This threshold value, however, is completely independent of external values. Contrary to this, the aforementioned patent document describes, in paragraph 35, a control device which has different threshold values for the triggering of the motor as a function of the direction of movement of the movable furniture part. In this case, the threshold value is for a measured unit representing a distance to be covered by the movable furniture part.

In the drive described in EP 1 374 732, shaking movements of the furniture (during when the movable furniture part moves a certain distance) can lead to incorrect meeting of the threshold value and resulting triggering of the motor. For example, especially when the movable furniture part is in a half-open position, it can happen that the shaking movements which arise when items are being placed in the movable furniture part are so great that the movable furniture part is moved by more than 1 mm away from the furniture body. When this meets the threshold value, it will lead to a per se unintentional triggering of the motor, as a result of which the movable furniture part is accelerated in the direction of the fully-open end position. Behavior of this type is regarded by most users as undesirable.

The problem of the invention is therefore to refine a generic drive in such a way that the risk of unintentional triggering is reduced.

SUMMARY OF THE INVENTION

This problem is solved by a drive with the features of the present invention.

In the above discussion, the threshold value related to a measured distance that a movable furniture part moves. The threshold value can, for example, also relate to the measured amount of a motion quantity of the movable furniture part, such as speed or acceleration. Alternatively, the threshold value can also relate to the measured amount of a force exerted by a user on the movable furniture part. In each of the cases mentioned, obviously a suitable measurement device must be provided to capture the respective values (measured unit).

It would of course also be possible to make use of the measurement device which must be provided anyway to capture of the position of the movable furniture part, and to use a distance to be covered by the movable furniture part as threshold value for the control or regulation unit.

The concept according to the invention makes it possible to design the control or regulation unit in such a way that when the drive is in the installed condition on a furniture body, the threshold value for the closed end position of the movable furniture part in or on the furniture body differs from the threshold value for the fully-open end position of the movable furniture part (i.e., there are different threshold values each corresponding to a respective position of the movable furniture part).

For example, the threshold value in or on the furniture body can be lower than the threshold value for the fully-open end position of the movable furniture part. This measure takes into account the fact that in its closed end position, the movable furniture part is scarcely exposed to any unintentional force effects. By selecting a lower threshold value in this end position, it is therefore possible to react earlier to the desire for actuation by a user. In the fully-open end position of the movable furniture part, however, there may arise unintentional influences of force due to the putting in or taking out of objects from the movable furniture part. A higher threshold value is therefore selected.

Provision may also be made that in the installed position of the drive on a furniture body, the threshold value for each position between the closed end position and the fully-open end position of the movable furniture part is higher than the higher of the two threshold values for the closed end position and the fully-open end position of the movable furniture part. Especially in the case of a partly-opened movable furniture part, unintentional shaking movements often occur which is why the control or regulation unit should react with the least sensitivity in this area.

Obviously it is possible, in addition to the aforementioned measures, as already described in EP 1 374 732 A1, to select the threshold value as a function of the direction of movement of the movable furniture part.

The movable furniture part can, in this case for example, be a drawer.

The present invention also includes a piece of furniture with a furniture body and a movable furniture part which can be moved in or on the furniture body. A drive according to one of the aforementioned embodiments is arranged in the piece of furniture.

BRIEF DESCRIPTION OF THE DRAWINGS

Further advantages and details of the invention will be disclosed with the aid of the figures and of the following description of the figures, in which.

DETAILED DESCRIPTION OF THE INVENTION

Figure 1:
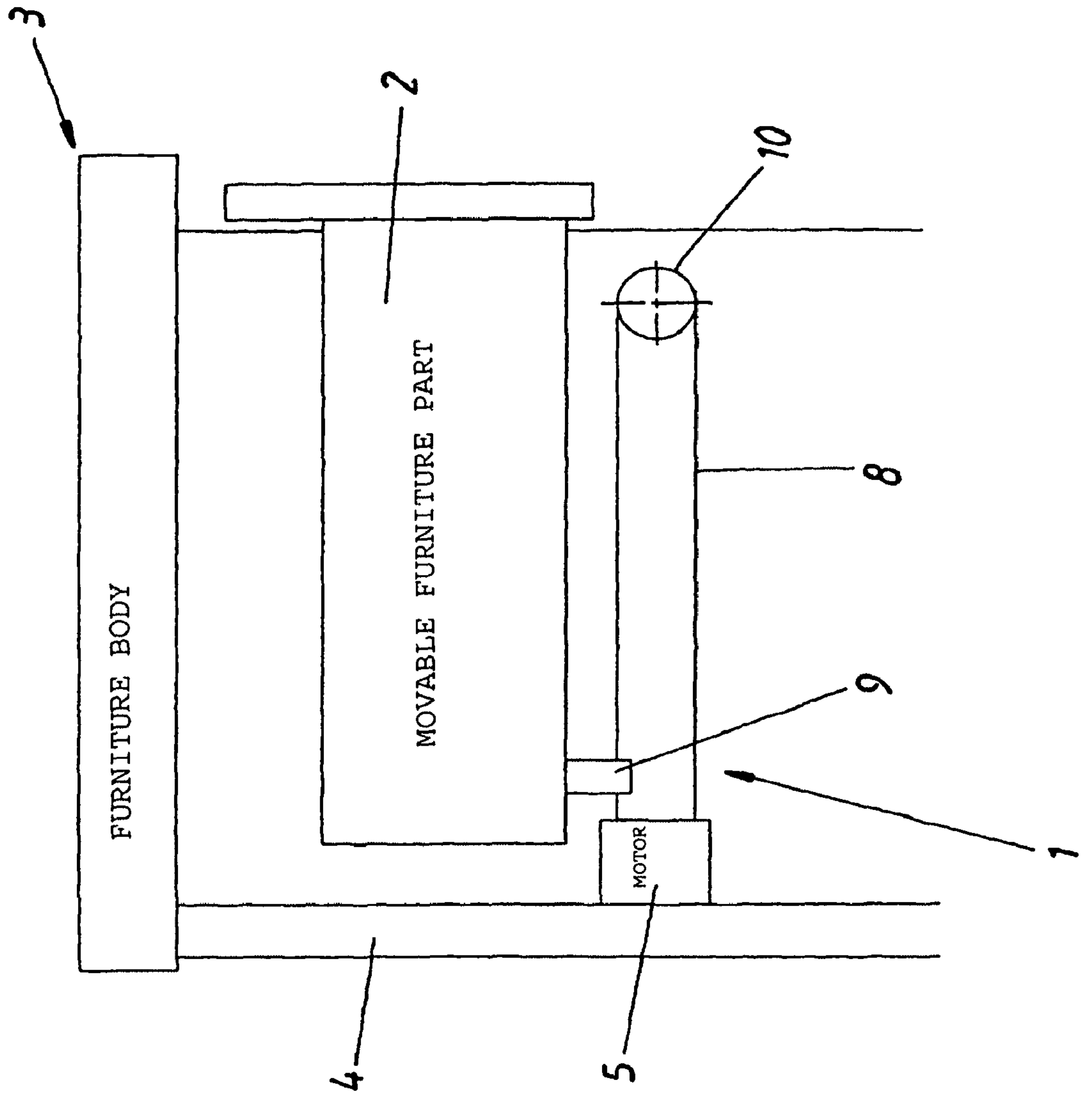
FIG. 1 is a schematic view of a drive according to the invention.

FIG. 1 shows a schematic view of a piece of furniture 3 with a furniture body 4 in which a movable furniture part 2 in the form of a drawer runs on bearings. A drive unit 1 is provided to move the movable furniture part, the drive comprising a motor 5, a cable pull 8 and a deflection pulley 10. The cable pull 8 is coupled with the movable furniture part 2 by a carrier 9. In the example shown in FIG. 1, the motor 5 itself includes the control or regulation unit and a measurement device to capture the position of the movable furniture part. The measurement device used here is an optical or inductive encoder, which is coupled with the roller of the cable pull 8 disposed on the motor side, not visible in FIG. 1. The encoder can measure the rotation angle and the speed of rotation of the cable pulley and thus the position, speed and acceleration of the movable furniture part. In this sense, the measurement device for capturing the position of the movable furniture part 2 also serves as a measurement device to capture the speed and/or acceleration of the movable furniture part.

Figure 2:
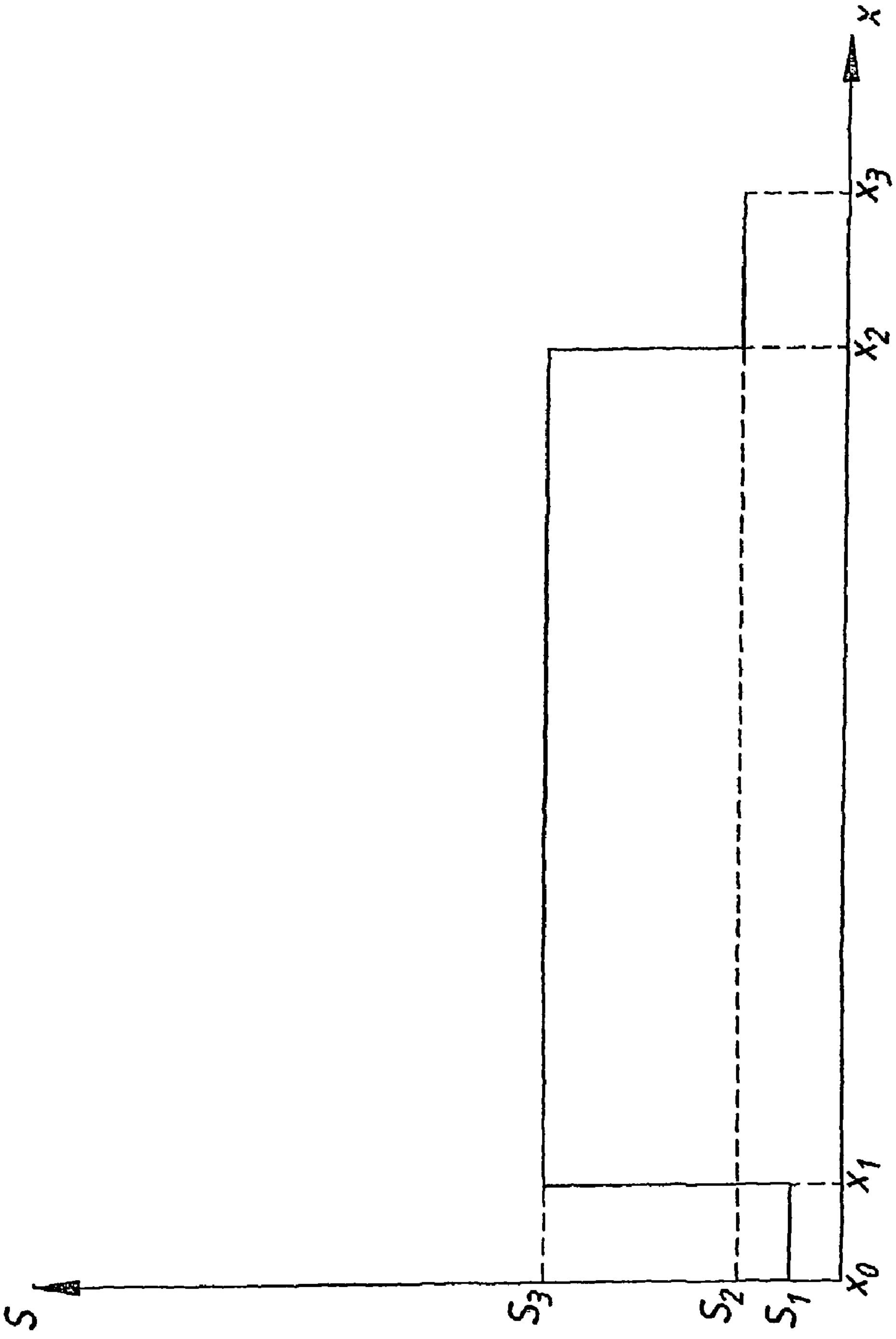
FIG. 2 is an illustration of the threshold value as a function of the position of the movable furniture Part.

In FIG. 2, the threshold value S is shown via the position x of the movable furniture part 2 shown in FIG. 1. In the position $x_0$ the movable furniture part 2 is in its closed end position in the furniture body 4. In the position $x_3$ the movable furniture part 2 is in its fully-open end position. In the positions $x_1$ and $x_2$, the movable furniture part 2 is in an intermediate position between the closed end position and the fully-open end position. It can be seen in FIG. 2 that the threshold value S between the positions $x_o$ and $x_1$ has a first value $S_1$. This area is in front of the closed end position of the movable furniture part 2 in the furniture body 4. In the area between the positions $x_2$ and $x_3$ the movable furniture part 2 has a second threshold value $S_2$. This area is in front of the fully-open end position of the movable furniture part 2. In the area between positions $x_1$ and $x_2$ the threshold value finally has a third value $S_3$. This area corresponds to a partial outward movement of the movable furniture part 2 from its closed end position.

Since the movable furniture part 2, in its closed end position in the furniture body 4, is least sensitive to unintentional force effects, the lowest value $S_1$ is selected for this area. The value $S_2$ for the area in front of the fully-open end position of the movable furniture part 2 is already selected to be somewhat higher since the movable furniture part 2 is exposed to stronger disruptive influences in this area. The threshold value $S_3$ is selected to be the highest since an only partly-opened movable furniture part 2 is most sensitive to an unintentional triggering.

Figure 3:
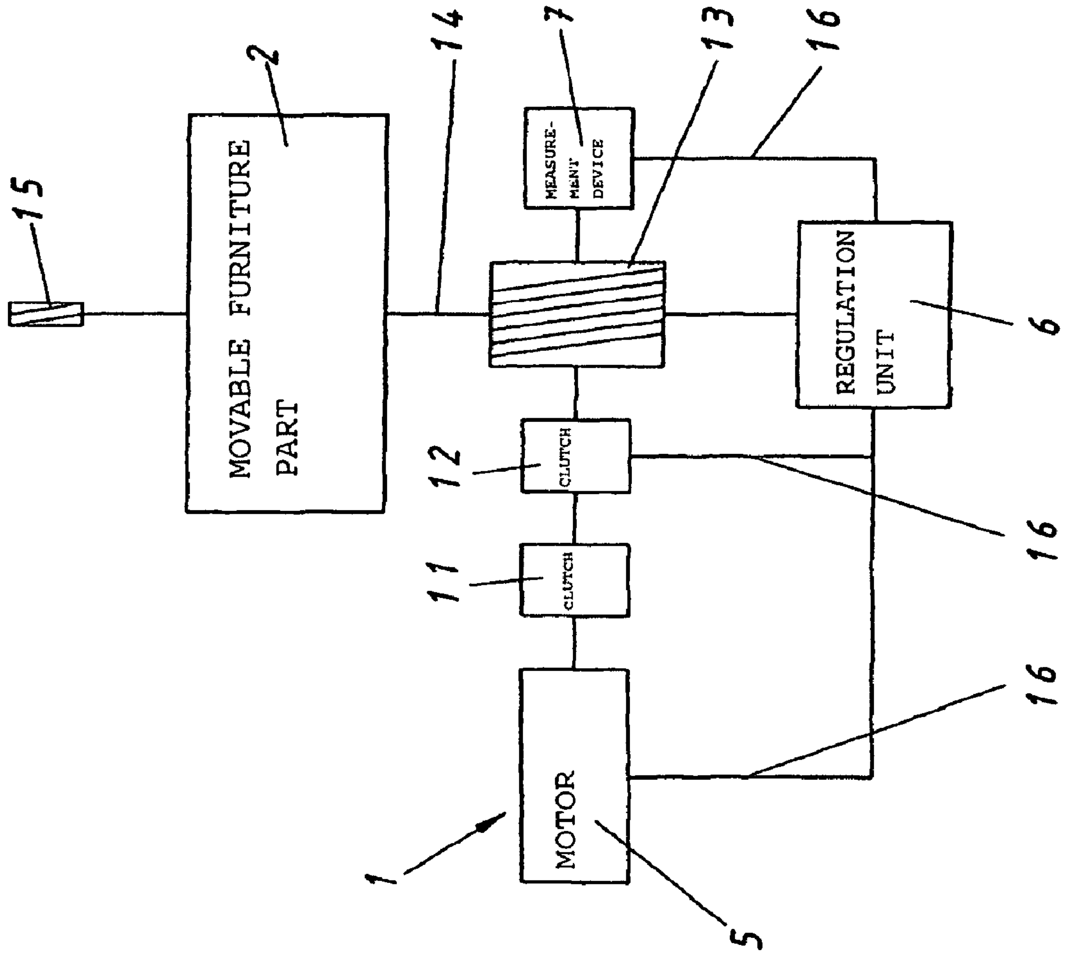
FIG. 3 is a schematic view of a further embodiment of a drive according to the invention.

In FIG. 3, a further embodiment of an inventive drive unit 1 is shown. The drive unit 1 comprises a motor 5 in the form of an electromotor, a clutch 11 for an axial tolerance compensation, an engaging and disengaging clutch 12, an output device 13 and a measurement device 7 to capture the position and motion quantities of the movable furniture part 2. Furthermore, a control or regulation unit 6 is provided, which communicates via cables 16 with the motor 5, the engaging and disengaging clutch 12 and the measurement device 7. The measurement device 7 can, as in the aforementioned embodiment, include an encoder which measures the rotation angle and the rpm of the output device 13. The output device 13 drives the movable furniture part 2 via a cable pull 14 which is steered via a deflection pulley 15. The engaging and disengaging clutch 12 can be disengaged and engaged by the control or regulation unit 6, as the result of which the exertion of force by the motor 5 on the output device 13 can be interrupted (when clutch 12, 15 disengages) or restored (when clutch 12 is engaged respectively.

Figure 4A:
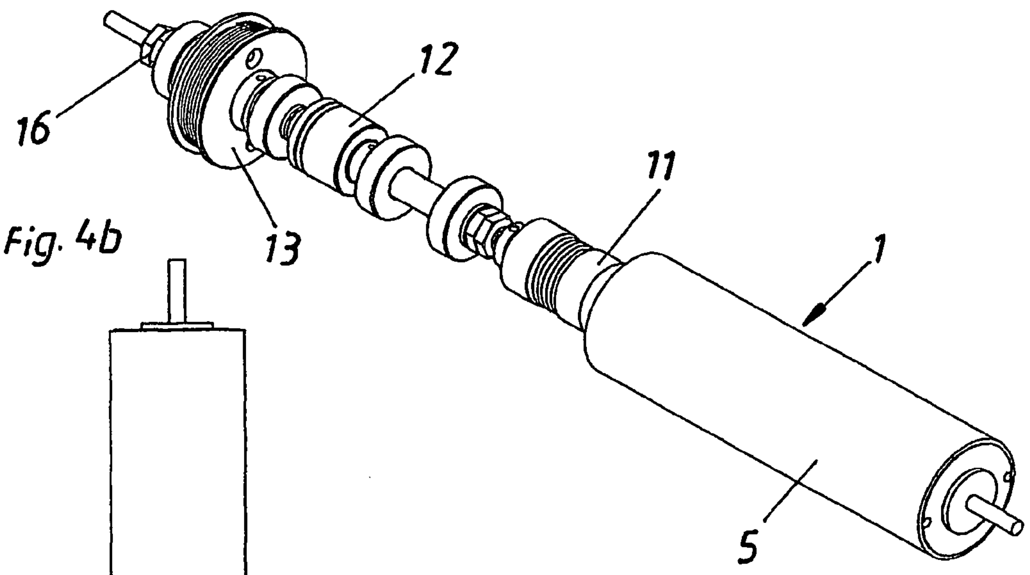
FIG. 4*a*, 4*b* is a perspective view and a top view of the embodiment shown schematically in FIG. 3.
Figure 4B:
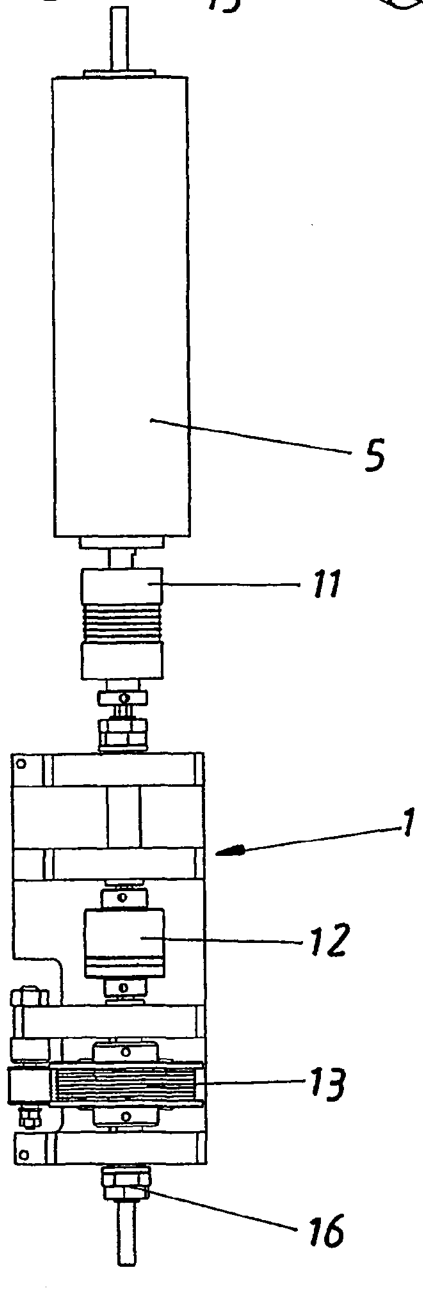

In FIGS. 4*a* and 4*b*, the drive unit 1 which is shown only schematically in FIG. 3 is shown in more detail. Especially recognizable here are the encoder 16 coupled to the output 13 and the clutch 11 for the axial tolerance compensation which has a compressible area for this purpose. As a result, the drive unit 1 can be adapted to the dimensions of the furniture body for installation in a furniture body.

Figure 5:
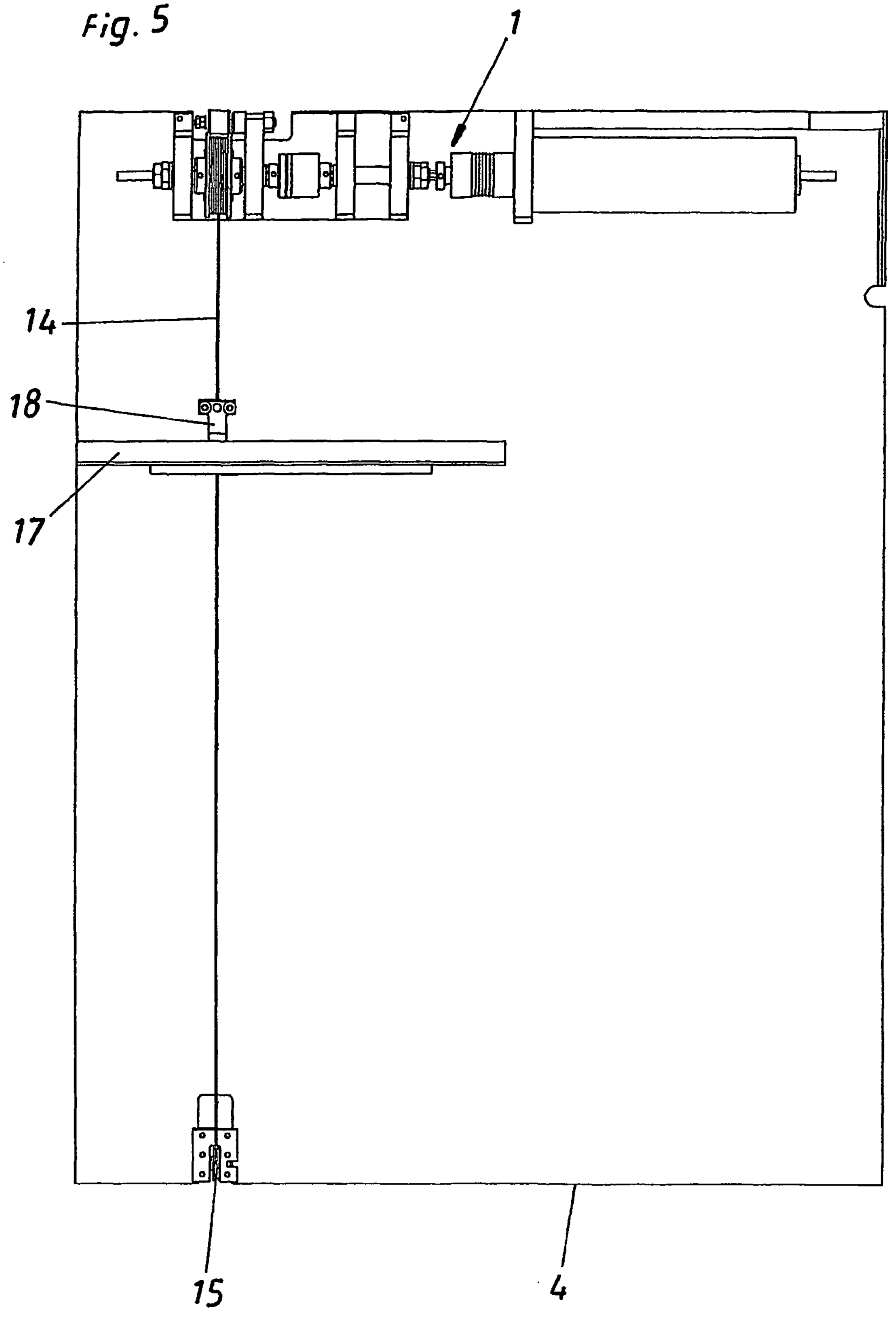
FIG. 5 is a top view of a piece of furniture with a drive as shown in FIGS. 3 and 4*a*, 4*b*.

In FIG. 5, the drive 1 is shown in its installed position on a furniture body 4. It is now possible to see the coupling of the cable pull 14 via a carrier 18 on the rear wall 17 of a movable furniture part 2, not otherwise shown in more detail.

For the embodiment shown in FIGS. 3 to 5, a progression of the threshold value S as a function of the position x of the movable furniture part 2 according to FIG. 2 is also provided.

The invention claimed is:

1. A drive unit for moving a movable furniture part, comprising:

a motor for moving the movable furniture part;

a position measurement device for determining a position of the movable furniture part; and a regulation unit for controlling an operation of said motor, said regulation unit having a plurality of different threshold values each corresponding to a respective position of the movable furniture part, said regulation unit being operable to actuate said motor to move the movable furniture part when a respective one of said threshold values corresponding to the determined position of the movable furniture part is surpassed.

2. The drive unit according to claim 1, further comprising a motion quantity measurement device for determining an amount of at least one motion quantity of the movable furniture part, said threshold values relating to the amount of the at least one motion quantity.

3. The drive unit according to claim 2, wherein the at least one motion quantity is the speed or the acceleration of the movable furniture part.

4. The drive unit according to claim 1, further comprising a force measurement device for determining a force exerted by a user on the movable furniture part, said threshold values relating to the amount of force determined by said force measurement device.

5. The drive unit according to claim 1, wherein said regulation unit has a first one of said threshold values corresponding to a closed end position of the movable furniture part, and has a second one of said threshold values corresponding to a fully-open end position of the movable furniture part, said first one of said threshold values being different than said second one of said threshold values.

6. The drive unit according to claim 5, wherein said first one of said first one of said threshold values is less than said second one of said threshold values.

7. The drive unit according to claim 6, wherein said regulation unit has a third one of said threshold values corresponding to an intermediate position of the movable furniture, part between the closed end position and the fully-open end position, said third one of said threshold values being greater than said first one of said threshold values and said second one of said threshold values.

8. The drive unit according to claim 5, wherein said regulation unit has a third one of said threshold values corresponding to an intermediate position of the movable furniture part between the closed end position and the fully-open end position, said third one of said threshold values being greater than said first one of said threshold values and said second one of said threshold values.

9. The drive unit according to claim 1, wherein said motor comprises an electromotor.

10. A piece of furniture comprising:

a furniture body;

a movable furniture part movable with respect to said furniture body; and a drive unit for moving said movable furniture part relative to said furniture body, said drive unit including:

a motor for moving said movable furniture part;

a position measurement device for determining a position of said movable furniture part; and a regulation unit for controlling an operation of said motor, said regulation unit having a plurality of different threshold values each corresponding to a respective position of said movable furniture part, said regulation unit being operable to actuate said motor to move said movable furniture part when a respective one of said threshold values corresponding to the determined position of said movable furniture part is surpassed.

11. The piece of furniture according to claim 10, further comprising a motion quantity measurement device for determining an amount of at least one motion quantity of said movable furniture part, said threshold values relating to the amount of the at least one motion quantity.

12. The piece of furniture according to claim 11, wherein the at least one motion quantity is the speed or the acceleration of said movable furniture part.

13. The piece of furniture according to claim 10, further comprising a force measurement device for determining a force exerted by a user on said movable furniture part, said threshold values relating to the amount of force determined by said force measurement device.

14. The piece of furniture according to claim 10, wherein said regulation unit has a first one of said threshold values corresponding to a closed end position of said movable furniture part, and has a second one of said threshold values corresponding to a fully-open end position of said movable furniture part, said first one of said threshold values being different than said second one of said threshold values.

15. The piece of furniture according to claim 14, wherein said first one of said first one of said threshold values is less than said second one of said threshold values.

16. The piece of furniture according to claim 15, wherein said regulation unit has a third one of said threshold values corresponding to an intermediate position of said movable furniture part between the closed end position and the fully-open end position, said third one of said threshold values being greater than said first one of said threshold values and said second one of said threshold values.

17. The piece of furniture according to claim 14, wherein said regulation unit has a third one of said threshold values corresponding to an intermediate position of said movable furniture part between the closed end position and the fully-open end position, said third one of said threshold values being greater than said first one of said threshold values and said second one of said threshold values.

18. The piece of furniture according to claim 10, wherein said motor comprises an electromotor.

19. The piece of furniture according to claim 10, further comprising a cable pull connecting said drive unit to said movable furniture part.

20. The piece of furniture according to claim 10, wherein said drive unit further includes:

an output device for transmitting a drive of said motor to said movable furniture part; and an engaging and disengaging clutch for allowing said motor to engage and disengage from said output device based on a regulation signal from said regulation unit.

* * * * *